July 10, 1951 F. GUYTON 2,560,104
AUTOMATIC OIL TANK SWITCH
Filed Dec. 12, 1947 2 Sheets-Sheet 1
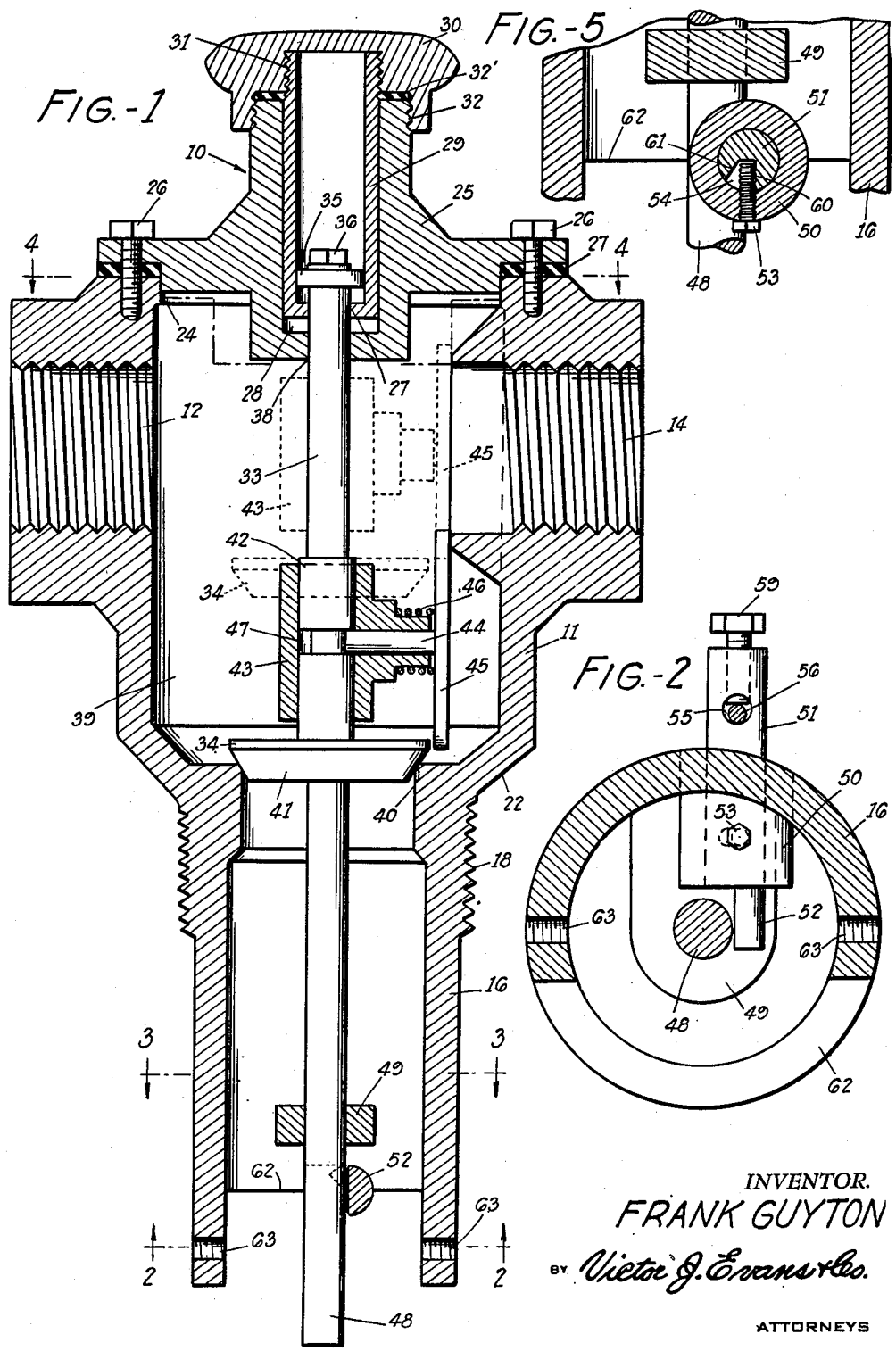
INVENTOR.
FRANK GUYTON
BY Victor J. Evans & Co.
ATTORNEYS July 10, 1951        F. GUYTON        2,560,104
AUTOMATIC OIL TANK SWITCH
Filed Dec. 12, 1947        2 Sheets—Sheet 2
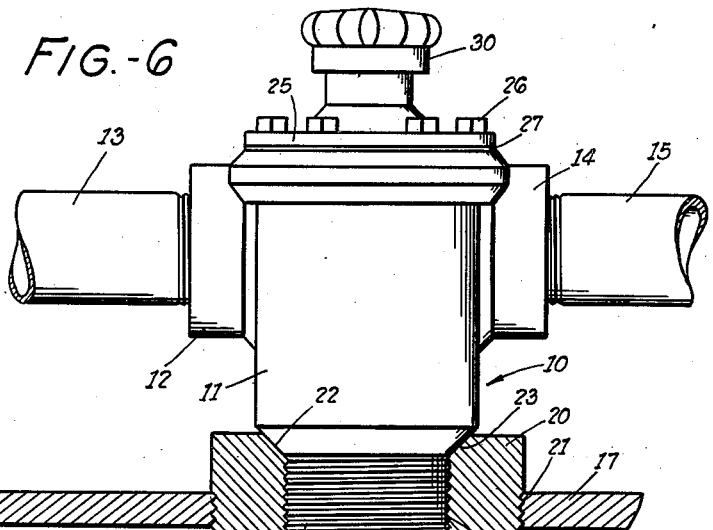
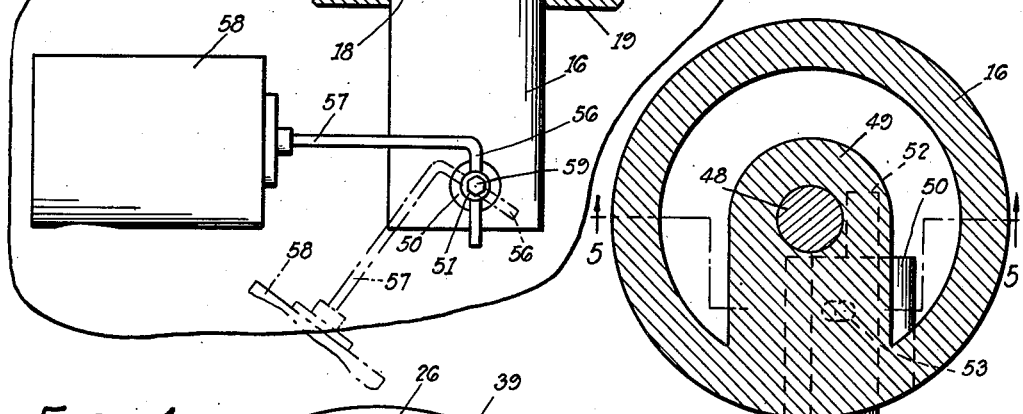
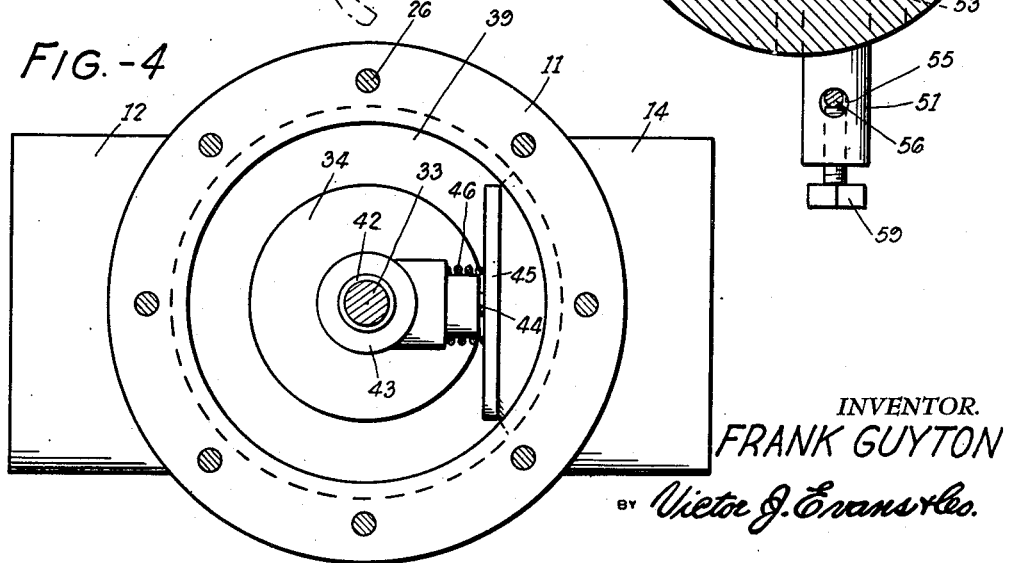
INVENTOR.
FRANK GUYTON
BY Victor J. Evans & Co.
ATTORNEYS Patented July 10, 1951

2,560,104

UNITED STATES PATENT OFFICE 2,560,104

AUTOMATIC OIL TANK SWITCH

Frank Guyton, Sperry, Okla.

Application December 12, 1947, Serial No. 791,416

1 Claim. (Cl. 137—68)

This invention relates to an automatic oil tank switch which is especially adapted to provide a means for controlling the flow of oil or other liquids or fluids from the supply source to tanks or other receptacles to be filled.

An object of the invention is to provide, therefore, a switch that will divert the flow of liquid from a tank that has been filled to an empty tank for the filling thereof.

The transfer from a filled tank to an empty tank in a series of tanks is accomplished automatically and without manual attention, thereby effectuating the saving of time, money, labor and the possible escape and loss of oil and gas or other liquids or materials.

With the above and other objects and advantages in view, the invention consists of the novel details of construction, arrangement and combination of parts more fully hereinafter described, claimed and illustrated in the accompanying drawings in which:

Figure 1 is a vertical, sectional view of an embodiment of the invention;

Figure 2 is a cross-sectional view on the line 2—2 of Figure 1;

Figure 3 is a cross-sectional view on the line 3—3 of Figure 1;

Figure 4 is a cross-sectional view on the line 4—4 of Figure 1;

Figure 5 is a cross-sectional view on the line 5—5 of Figure 3 and

Figure 6 is an elevational view of the device as applied to a tank or receptacle, a fragmentary section of which is shown to illustrate the application of the device.

Referring more in detail to the drawings, the switch embodying the invention is generally designated by the reference numeral 10. The switch 10 comprises the housing or body 11, having the internally threaded inlet 12 which may be connected to a source of supply or to the preceding similar housing by a pipe 13, and an internally threaded outlet or by-pass 14 which is adapted to be connected to a pipe 15 leading to a series of succeeding tanks, each equipped with a switch 10.

The housing has a depending conduit or nozzle 16, which is adapted to enter a tank 17, as shown in Figure 6. The nozzle has a threaded portion 18 which, engaging the threaded portion 19 of the coupling 20 which is tapped into the tank at 21, holds the housing in fixed relation to the tank. A tapered lower periphery 22 of the housing 11 snugly engages the similarly tapered seat 23 in the coupling 20.

The housing 11 is provided with an opening 24 in its upper wall, which is closed by the head 25 secured to the housing by bolts 26. A gasket 27 interposed intermediate the head and the housing provides a fluid tight seal.

The head 25 is provided with a circular recess 28 centrally thereof, in which is provided a lifting sleeve 29. A crown cap 30 is tapped on the upper end of the sleeve 29 at 31, and is tapped on the head 25 at 32. A gasket 32, sleeved on the sleeve 29, within the cap 30 provides a fluid tight seal at this point.

Mounted for reciprocation within the sleeve 29 is the upper valve stem 33 of the valve 34. The upper end of the stem 33 has a disc gasket 35 secured thereto by a bolt 36, and the gasket is of a diameter equal to the internal diameter of the sleeve 29. The stem passes through the central opening 37 in the bottom of the sleeve, and the central opening 38 in the bottom of the housing 11.

The valve 34 is vertically reciprocable within the chamber 39 in the housing 11, and is engageable with the tapered seat 40 in the housing 11. The valve 34 has a lower tapered periphery 41 connecting with the seat 40 of the housing.

The stem 33 has an enlarged portion 42 on which is mounted the T-coupling 43. The enlarged portion 42 passes through the head of the coupling 43 and the stem 44 of the valve 45 mounted in the stem portion of the coupling 43. A spring 46 sleeved on the coupling 43 engages the rear of the valve 45 to urge it outwardly of the coupling 43. The rear end of the stem 44 is receivable in the circumferential slot 47 which is located centrally of the coupling 43 in alinement with the stem portion thereof.

The valve 34 is provided with a lower stem portion 48 which extends downwardly into the nozzle 16, and is slidably engaged in the guide 49 formed integral with the nozzle 16.

Formed integral with the nozzle 16, below the guide 49, is a bushing or housing 50, in which is rotatably mounted the trigger 51. The forward end of the trigger 51 has a half-moon shaped tip 52 which will coact with the stem 48, as will be later described.

The bushing 50 carries a limited screw 53 which, engaging in the socket 54, limits the movement of the trigger 51. The trigger has opening 55 extending therethrough, which is adapted to receive the vertical portion 56 of the horizontal arm 57 on which is fixed the float 58. A set screw 59 fixes the portion 56 in the trigger, The socket 54 has a face 60 which will permit the float 58 to reach the horizontal position shown in full in Figure 6, and the forty-five degree angled face 61 which permits the float to assume the position shown in dotted lines in Figure 6.

The lower end of the nozzle 16 has a cutout portion 62 therein, which is oppositely disposed from the bushing 50 which is at the central transverse line of the nozzle 16, and inwardly of the cutout portion 62. The opposed alined tapped bores 63 provided in the lower end of the nozzle 16 are used to connect a sleeve, not shown, to the lower end of the nozzle 16. At times, users of the automatic switch employ the above mentioned sleeve to prevent spraying of the oil as it is dispensed into the tank. The oil forming into a spray results in loss of oil by evaporation, especially the lighter parts of the oil. Therefore, in order that such a sleeve may be attached, the bores 63 are provided in the nozzle, but the sleeve does not constitute a part of the invention as described.

The cutout 62, at the lower end of the nozzle, is provided for the purpose of allowing an additional outlet for the oil. Otherwise, the oil would congest at the trigger and result in a reduced flow of oil. If the sleeve mentioned above is used, it is provided with a cutout opposite to the cutout 62, thus leaving the trigger mechanism free to operate. By sealing the cutout opening in the nozzle, the oil will flow down through the sleeve, rather than out of the nozzle at the cutout.

In operation, liquid will be introduced into the housing 11 from the pipe 13. Passing through the housing 11, the liquid will be discharged from the nozzle 16 into the tank 17.

With the tank empty, the float 58 is in the position shown by dotted lines in Figure 6. The curved portion of the tip 52 is underlying the stem 48, and valves 34 and 45 are in the position shown by dotted lines in Figure 1. With valve 34 opening the nozzle 16 and valve 45 closing the outlet 14, the fluid will enter tank 17. As the liquid rises in the tank 17, the float 58 will also rise, and the trigger 52 will roll from under the stem 48, permitting the valve 34 to close the nozzle 16 when in full horizontal position and lower the valve 45 to open the outlet 14. Thus the liquid will now pass into the housing 11, and out the outlet 14.

Thus the switch has cut off fluid to the tank 17, to permit the next tank in line to be filled. The flow of oil will continue through all succeeding pipe links and tanks, and similar switch housings until the last tank has been filled.

To reset the valve, the crown cap 30 is unscrewed from the housing 11. Upon lifting the cap 30 the sleeve 29 will engage the gasket 35 and lift the stem 33 and the valve 34 thereon until the tip 52 of the trigger 51 is again in position below the stem 48, when the tank is again ready for filling.

Any tank in the series may be by-passed as desired by not resetting the switch, as above explained, or the switch can be manually closed. The manual operation is permissible, since the switch is usually located on the tank in close proximity to the thief hatch on the deck of the tank. Thus if the tank is empty, and it is desired to by-pass the tank, the thief hatch is opened, and a person reaching through the thief hatch can manually raise the float. Raising of the float trips or rolls the trigger, releasing the valve and cutting off the flow of oil to the tank. Thus when the tank is automatically operated by the oil, the oil will enter inlet 12 and flow outwardly of outlet 14.

Thus a particular tank can be repaired or cleaned out, as desired, without interfering with the flow of liquid to the remaining tanks in the series.

The working parts of the switch are also enclosed for protection against the weather, except when the switch is being reset, and the small length of time the sleeve 29 is exposed will not permit damage thereto from exposure.

The switch is self-contained with few working parts, making a durable and effective assembly.

It is believed that from the foregoing description, the operation and structure of the invention will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

An automatic valve for an oil storage tank, comprising a hollow body having an opening in its upper side and an inlet port and a by-pass port, an outlet conduit communicating with the body below said ports and extending downwardly from the body, a head closing the opening in the upper side of the body and provided with an axial bore, a sleeve provided at its lower end with an inner annular flange and mounted in the bore for rotation and endwise movement with relation to the head, a cap secured to the upper end of the sleeve and detachably engaged with the head so as to seal the end of said axial bore, a valve stem slidable axially of the head, body and outlet conduit and having its upper end positioned in the lower portion of the sleeve, a washer on the upper end of the valve stem adapted to engage the flange of the sleeve, valve units mounted on the stem for movement thereby into an up position or a down position, the detachable cap, sleeve and washer constituting means by which the valve units may be lifted to their up position and then released for automatic movement to a down position, the valve units when in up position closing the by-pass port and opening communication between the body and outlet conduit, and the valve units when in down position opening the by-pass port and closing communication between the body and outlet conduits, and a float actuated means cooperating with said valve stem to releasably hold the valve units in up position.

FRANK GUYTON.

REFERENCES CITED

The following references are of record in the file of this patent:

UNITED STATES PATENTS

| Number | Name | Date |
|---|---|---|
| 579,114 | Libbey | Mar. 16, 1897 |
| 1,010,274 | Leisel | Nov. 28, 1911 |
| 1,732,107 | Morgan | Oct. 15, 1929 |
| 1,736,933 | Morgan | Nov. 26, 1929 |